T. Wiltse, Jr.
Horse Power.
N°69,736. Patented Oct. 8, 1867.
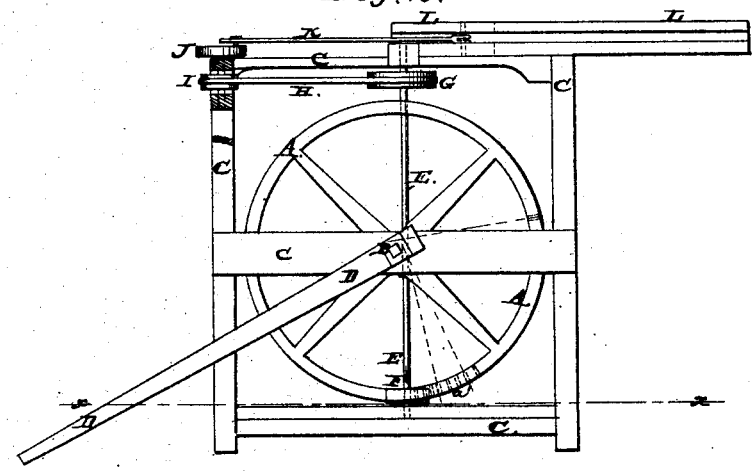
Witnesses:
Theo. Gutsche.
Wm. Treurn.
Inventor.
Thos Wiltse.
Per Munn & Co.
Attorneys.

United States Patent Office.

THOMAS WILTSE, JR., OF PANAMA, NEW YORK.

Letters Patent No. 69,736, dated October 8, 1867.

---

IMPROVEMENT IN HORSE-POWER.

---

*The Schedule referred to in these Letters Patent and making part of the same.*

---

TO ALL WHOM IT MAY CONCERN:

Be it known that I, THOMAS WILTSE, Jr., of Panama, in the county of Chautauqua, and State of New York, have invented a new and improved Horse-Power; and I do hereby declare that the following is a full, clear, and exact description thereof, which will enable others skilled in the art to make and use the same, reference being had to the accompanying drawings, forming part of this specification.

Figure 1 is a vertical section of my improved machine, taken through the line $x\ x$, fig. 2.

Figure 2 is a top or plan view of the same, part of the frame being broken away to show the construction.

Similar letters of reference indicate corresponding parts.

My invention has for its object to furnish an improved horse-power, designed especially for operating a drag-saw, but equally applicable for other uses, and which shall be simple in construction, durable, and effective in operation; and it consists in the combination of the drive-wheel, vertical-shaft pinion-wheel, horizontal shaft, pulley-band, and crank-pulley with each other, and in the combination of a bridge or spout with the frame and crank-pitman of the machine, the whole being constructed and arranged as hereinafter more fully described.

A is the drive-wheel of the machine, which is set in a horizontal position, and has cogs or teeth $a'$ formed upon the under side of its rim, which said teeth are so formed as to point to one side of the centre of the wheel A, as shown in dotted lines in fig. 2. The lower end of the shaft B of the wheel A works in a socket formed in the central sill of the frame C, and its upper end passes up through the central top cross-bar of said frame, and has the lever or sweep D attached to it, to the outer end of which the horses are attached. E is a shaft, passing horizontally across the central part of the machine, at one side of the vertical shaft B, and revolving in bearings in the frame C. To one end of the shaft E is attached a pinion-wheel, F, the teeth of which mesh into the teeth of the driving-wheel A. To the other end of the shaft E, within the frame C, is attached a band-pulley, G. H is the band or belt which passes around the pulley G and around the pulley I, the journals of which revolve in bearings in the frame C, and to the outer end of one of which journals is attached the crank-wheel or pulley J, to which is pivoted the end of the pitman K, by which motion is communicated to the sliding-saw pitman, or to other machinery to be driven by the power. L is a bridge or box, attached to the side of the frame C, to receive, guide, and protect the said sliding pitman.

By this construction and arrangement of the bridge L, the horses attached to the sweep D will cross the said bridge obliquely, so that they will not both cross the said bridge at exactly the same time, as they do in other powers. This does away with the irregular motion caused by the slight hesitation of the horses in stepping over the said bridge, and keeps the machine always moving steadily and with uniform velocity.

I claim as new, and desire to secure by Letters Patent—

The combination of the driving-wheel A, having oblique teeth $a'$, formed as described, upon the under side of its rim, the vertical shaft B, horizontal shaft E, pinion-wheel F, band-pulley G, band or belt H, pulley I, and crank-pulley or wheel J, with each other and with the frame C, the sliding pitman-box or bridge L, the frame C, and crank-pitman K, substantially in the manner herein shown and described, and for the purpose set forth.

THOMAS WILTSE, Jr.

Witnesses:
SPENCER GOODRICH,
E. E. CHAMBERLAIN.